UNITED STATES PATENT OFFICE.

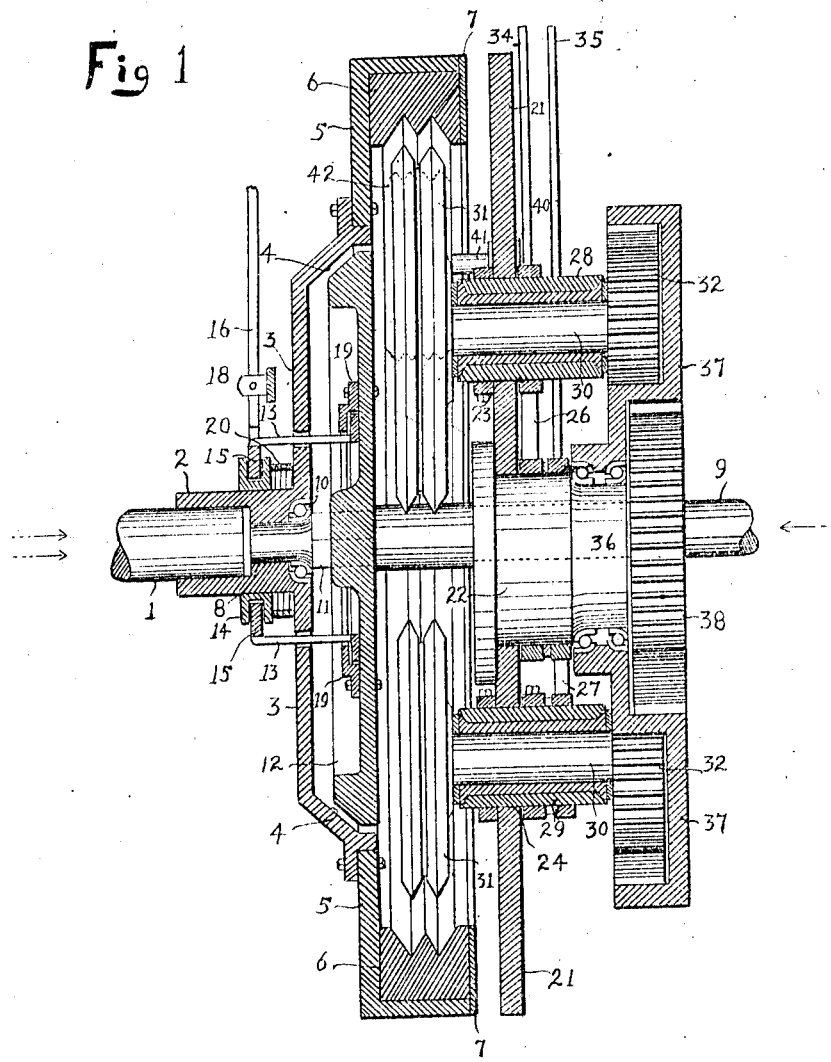

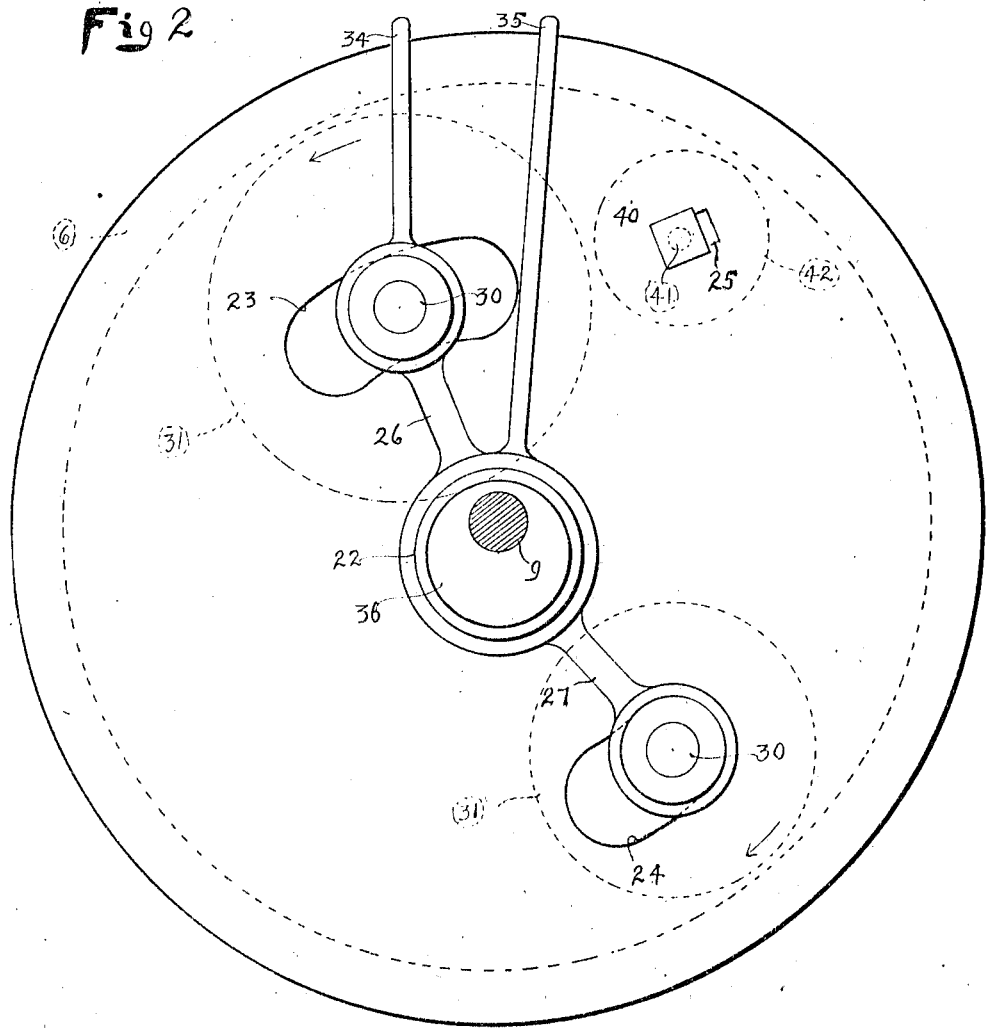

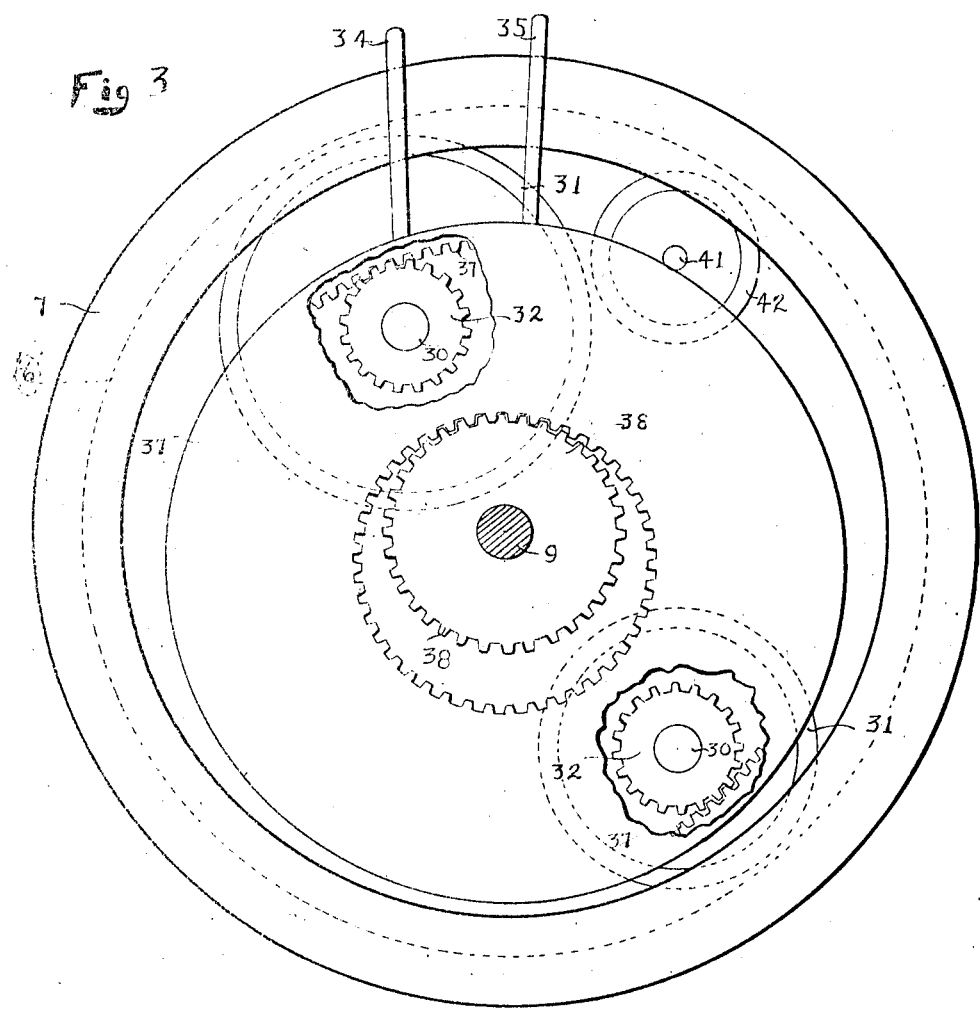

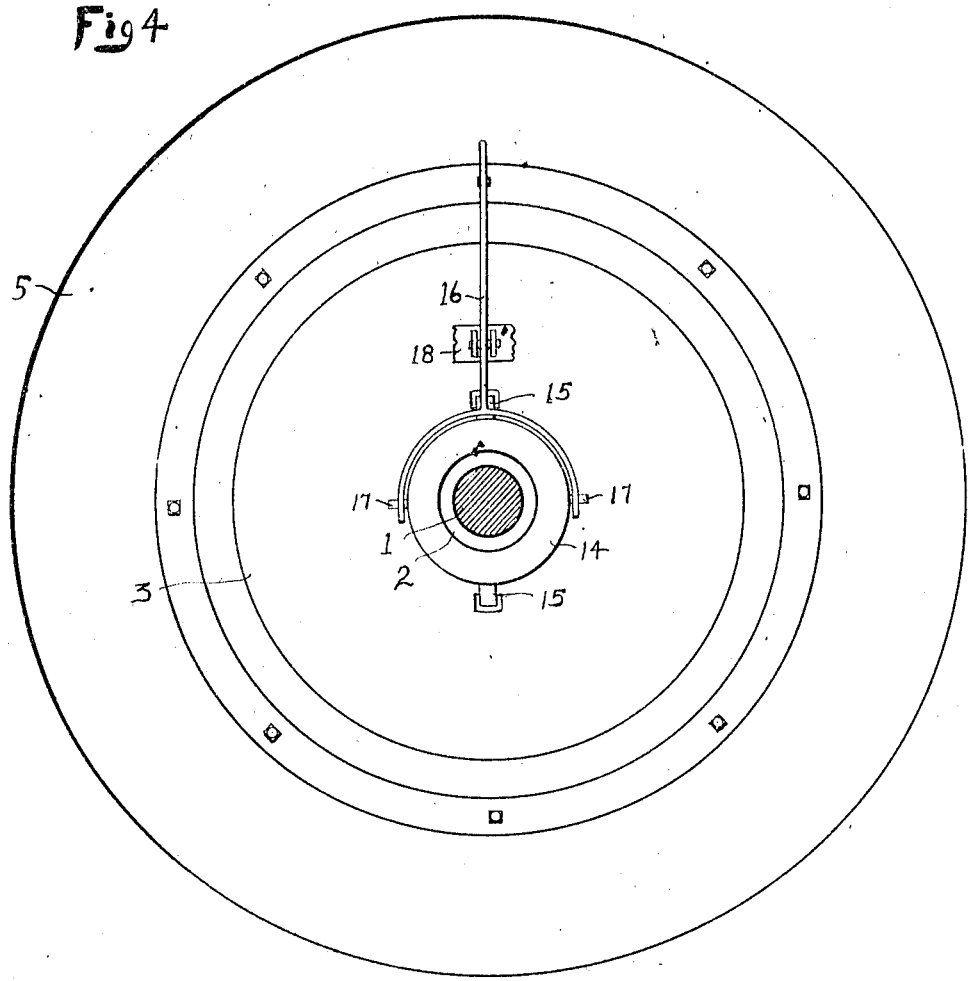

HARRY B. CLARK, OF SAN FRANCISCO, CALIFORNIA, ASSIGNOR OF ONE-THIRD TO CARLOS P. GRIFFIN AND ONE-THIRD TO JOHN J. DUFFIE, BOTH OF SAN FRANCISCO, CALIFORNIA.

FRICTION TRANSMISSION MECHANISM.

1,035,155.     Specification of Letters Patent.     Patented Aug. 13, 1912.

Application filed August 28, 1911. Serial No. 646,514.

*To all whom it may concern:*

Be it known that I, HARRY B. CLARK, a citizen of the United States, residing at San Francisco, in the county of San Francisco and State of California, have invented a new and useful Friction Transmission Mechanism, of which the following is a specification in such full and clear terms as will enable those skilled in the art to construct and use the same.

This invention relates to a mechanical movement, and its object is to drive one shaft from another at several different speeds shifting from one speed to another being accomplished without sliding gears into and out of mesh.

Another object with the device is to provide a friction driving gearing whereby, the benefits accruing from the V groove type of driving mechanism may be attained without the usual disadvantage due to the grinding effect of other types of change speed friction driving mechanism.

Another advantage to be gained from this form of friction driving mechanism, lies in the fact that the driving shaft may be coupled with the driven shaft when it is desired to drive the latter at the speed of the driving shaft.

In the drawings in which the same numeral of reference is applied to the same portion throughout the several views, Figure 1 is a vertical cross section view of the change gearing, and a portion of the driven and driving shafts. Fig. 2 is a view of the apparatus looking toward the driving shaft, in the direction of the arrow on Fig. 1; Fig. 3 is a view similar to Fig. 2 with the supporting plate omitted to illustrate the position of the several parts of the apparatus, and Fig. 4 is a view of the apparatus looking toward the driven shaft as indicated by double arrows in Fig. 1.

The numeral 1 represents the engine shaft upon which is rigidly secured a hub 2 having a flange 3, which has a suitable inclined clutch face at 4. This flange 3 carries a ring 5 bolted thereto which ring supports a fiber friction ring 6, the latter held in place by means of a metal ring 7 suitably secured to the ring 5. The hub 2 has an opening therein at the small end 8 of the driven shaft 9, suitable ball-bearings being installed at 10 for the shaft 9 to be journaled in.

The shaft 9 is squared as shown at 11, and has a friction wheel 12 slidable thereon, which friction wheel is adapted to contact with the friction face 4. Extending through the flange 3, are rods 13, said rods being secured to a slidable grooved collar 14. The grooved collar carries a ring 15 which is secured to the fork lever 16 by means of suitable ears 17. The lever 16 is suitably pivoted to a fixed part of the frame supporting the change gearing as shown at 18. The ends of the rods 13 are turned outwardly, and are placed within a flange 19 secured to the wheel 12 and a suitable heavy spring 20 is interposed between the flange 3 and ring 14. The object is to cause the clutch wheel 12 and flange 3 to contact with each other normally, a movement of the lever 16 being required to disengage the clutch parts. In front of the ring 7 there is a fixed plate 21, said plate having a suitable hub 22, the center of which is eccentric with respect to the shafts 1 and 9. The plate 21 has two slots 23 and 24 therein concentric with the center of the hub 22, and one straight slot 25. Mounted upon the hub 22 are two arms 26 and 27, said arms having journal boxes at 28 and 29 respectively. Journaled in each of the boxes 28 and 29 is a shaft 30, each shaft having a friction wheel 31 and gear wheel 32 thereon. The friction wheels are grooved to match the grooves in the fiber ring 6, and may be brought into contact therewith by a movement thereof in the direction indicated by the arrows on Fig. 2, levers 34 and 35 effecting the movement of said wheels. Journaled on a reduced portion 36 of the hub 22 is a double internal gear 37, the large gear thereof meshing with the gears 32, while the other set of teeth mesh with a gear 38 which is rigid on the shaft 9. The straight slide 25 carries a sliding box 40, having a fixed pin 41, which pin supports a roller 42 having grooves in the edge thereof which will properly contact with the wheel 31, while the edge thereof contacts with the outer edge of the grooves in the fiber ring 6.

From the above description the operation of the device will be seen to be as follows: The spring 20 will cause the part 12 to contact with the face 4, whereupon, shafts 1 and 9 will be rotated at substantially the same speed allowing for the usual clutch slip. When it is desired to rotate the shaft 9 at a less speed than that of the shaft 1, the clutch member 12 is released, and one of the wheels 31 is moved into contact with the fiber ring. Since it is moving at that time in the same direction as the fiber ring, the only effect will be to change the speed of the shaft 9 without noise, since the wheel 31 will slip suitably. When it is desired to reverse direction of shaft 9 the larger wheel 31 is moved into contact with the roller 42, and pressure upon this wheel will cause said roller and its box to move outwardly into contact with the fiber ring 6, whereupon the direction of the motion of shaft 9 will be reversed. It will be observed that the journal boxes 28 and 29 may be moved in their slots at will, since these slots are concentric with the gear wheel 37 with which the gears 32 and 38 are in mesh.

Having thus described my invention what I claim as new and desire to secure by Letters Patent of the United States, is as follows:

1. In a mechanical movement, a driving shaft and a driven shaft in line therewith, means to connect the two shafts so that they will rotate at substantially the same speed at will, a gear supported eccentric to the driven shaft, a wheel having internal friction surfaces carried by the driving shaft, a short shaft, a gear on one end thereof capable of being brought into and out of contact with the friction surfaces, and means to rotate the driven shaft from the eccentric gear at a different rate of speed from that of the driving shaft, substantially as described.

2. In a mechanical movement, a fixed support, a driving shaft and a driven shaft in line, means to connect the driving and driven shafts to rotate at substantially the same speed at will, a wheel having internal friction surfaces carried by the driving shaft, a journal box having means secured thereto to cause it to be capable of movement eccentric to the friction surfaces of said wheel, a shaft supported in said journal box, a gear on one end thereof and a friction roller on the other end thereof, an internal gear in mesh with the aforesaid gear on said short shaft and revoluble eccentric to the driving shaft, and means to rotate the driven shaft from said eccentric gear, substantially as described.

3. In a mechanical movement, a driving shaft and a driven shaft in line therewith, means to connect the driving shaft and driven shaft so that they will rotate at substantially the same speed, a gear carried by the driven shaft, a second gear eccentric therewith, a friction rim carried by the driving shaft, a friction wheel movable concentric with said eccentric gear to contact with the friction rim, a short shaft supporting said friction wheel, and a gear carried by said short shaft in mesh with said eccentric gear.

4. In a mechanical movement, a driving shaft and a driven shaft in line therewith, a clutch to connect the driving and driven shaft to rotate the latter at substantially the speed of the former at will, a friction rim carried by the driven shaft, a short shaft journaled eccentric to the driving shaft, a friction wheel carried by the short shaft, means to move said friction wheel into and out of contact with the friction rim, a gear eccentric to said driving shaft, a gear on said short shaft in mesh with said eccentric gear, means to rotate the driven shaft from said eccentric gear and means to reverse the direction of rotation of said driven shaft, substantially as described.

5. In a mechanical movement, a driving shaft and a driven shaft in line therewith, a clutch to connect the driving shaft to the driven shaft to rotate the latter at substantially the same speed as the former, a friction rim carried by the driven shaft, a fixed support adjacent said rim, a gear on the driven shaft, a gear in mesh with said gear and eccentric thereto, a journal box movable on said support concentric with said second gear, a shaft carried by said journal box, a friction wheel and a gear on said shaft, the latter in mesh with the aforesaid eccentric gear, and means to move the friction wheel into and out of contact with the friction rim.

6. In a mechanical movement, a driving shaft and a driven shaft in line therewith, a clutch to connect the driving shaft to the driven shaft to drive the latter at substantially the same speed as the former at will, a friction rim carried by the driving shaft, a support adjacent said friction rim, a hub on said support through which the driven shaft passes, a gear on the driven shaft, an internal gear in mesh with the gear on the driven shaft and revoluble on the hub eccentric to the driven shaft, journal boxes carried by said support movable concentric to said internal gear, a shaft in each of said journal boxes, a friction wheel and a gear carried by each of said shafts, the gears on the latter shaft being in mesh with another set of teeth on said internal gear, and means to move the friction wheel into and out of contact with the friction rim at will.

7. In a mechanical movement, a driving shaft and a driven shaft in line therewith, a clutch to connect them to move the latter at substantially the speed of the former at will, a friction rim carried by the driving shaft, a support adjacent said friction rim, a hub carried by said support, a gear on the driven shaft, an internal gear carried by said hub and revoluble eccentric to the driven shaft, arms carried by the hub, journal boxes connected to said arms, a shaft in each of said journal boxes, a friction wheel and a gear on each shaft, the latter in mesh with a second set of teeth on said internal gear, means to move the friction wheels into and out of contact with the friction rim and another friction wheel adapted to be moved into contact with the rim by one of said friction wheels to reverse the direction of rotation of said driven shaft.

8. In a mechanical movement, a driving shaft and a driven shaft in line, a friction rim carried by the driving shaft, a clutch member to rotate the driven shaft at the speed of the driving shaft at will, a fixed support adjacent said friction rim, a journal box movable in said fixed support eccentric to the friction rim, a shaft in said journal box, a friction wheel and a gear on said shaft, a second gear in mesh with the first gear, means to rotate the driven shaft from said second gear, and means to move the friction wheel into and out contact with the friction rim, substantially as described.

9. In a mechanical movement, a driving shaft and a driven shaft in line, a friction rim carried by the driving shaft, a clutch member to rotate the driven shaft at the speed of the driving shaft at will, a fixed support adjacent said friction rim, a journal box movable in said friction support eccentric to the friction rim, a shaft in said journal box, a friction wheel and a gear on said shaft, a second gear in mesh with the first gear, means to rotate the driven shaft from said second gear, means to move the friction wheel into and out of contact with the friction rim and a second roller slidable in the fixed support to contact with the friction rim for reversing the direction of rotation of the driven shaft, substantially as described.

10. In a mechanical movement, a driving shaft and driven shaft in line therewith, a friction rim carried by the driving shaft, a clutch member capable of rotating the driven shaft at the speed of the driving shaft at will, a fixed support adjacent the friction rim, a hub carried thereby, links revoluble on said hub and each supporting a journal box, a shaft in each box, a friction wheel and a gear on each of said shafts, means to move either of said friction wheels into contact with the friction rim, a third friction wheel slidable in said support and against which one of the aforesaid friction wheels may be moved to push the latter friction wheel into contact with the friction rim to reverse the direction of rotation of the friction wheel, an internal gear in mesh with both of the aforesaid gears and means to rotate the driven shaft from said internal gear, substantially as described.

11. In a mechanical movement, the combination of a driving shaft and driving wheel carried thereby, a driven shaft in line with the driving shaft, a gear surrounding the driven shaft and eccentric thereto and means to interconnect the eccentric gear, the driving shaft and driving wheel to rotate the driven shaft at a plurality of speeds, substantially as described.

12. In a mechanical movement, the combination of a driving shaft and driving wheel carried thereby, a driven shaft in line with the driving shaft, means to connect the driving and driven shafts at will to rotate at substantially the same speed, a gear surrounding the driven shaft and eccentric thereto and means to interconnect the eccentric gear, driving shaft, driven shaft and driving wheel to rotate the driven shaft at a different rate of speed from that of the driving shaft, substantially as described.

In testimony whereof I have hereunto set my hand this 16th day of August A. D. 1911, in the presence of the two subscribed witnesses.

HARRY B. CLARK.

Witnesses:
 G. O'CONNOR,
 C. P. GRIFFIN.